United States Patent
Ravise et al.

(10) Patent No.: US 11,208,193 B2
(45) Date of Patent: Dec. 28, 2021

(54) SOUND ATTENUATION PANEL FOR AN AIRCRAFT

(71) Applicant: AIRBUS OPERATIONS SAS, Toulouse (FR)

(72) Inventors: Florian Ravise, Saint-Herblain (FR); Wolfgang Brochard, Carbonne (FR)

(73) Assignee: Airbus Operations SAS, Toulouse (FR)

( * ) Notice: Subject to any disclaimer, the term of this patent is extended or adjusted under 35 U.S.C. 154(b) by 496 days.

(21) Appl. No.: 16/201,035

(22) Filed: Nov. 27, 2018

(65) Prior Publication Data

US 2019/0161157 A1  May 30, 2019

(30) Foreign Application Priority Data

Nov. 28, 2017  (FR) ...................................... 1761249

(51) Int. Cl.
*B64C 1/40* (2006.01)
*F02C 7/045* (2006.01)
*G10K 11/168* (2006.01)

(52) U.S. Cl.
CPC ................ *B64C 1/40* (2013.01); *F02C 7/045* (2013.01); *G10K 11/168* (2013.01); *B64C 2220/00* (2013.01); *F05D 2260/96* (2013.01)

(58) Field of Classification Search
CPC ....... F02C 7/045; B64C 1/40; B64C 2220/00; G10K 11/168; F05D 2260/96
USPC ......................................................... 181/286
See application file for complete search history.

(56) References Cited

U.S. PATENT DOCUMENTS

| 3,819,007 | A | * | 6/1974 | Wirt | ........................ B32B 3/266 |
| | | | | | 181/286 |
| 3,887,031 | A | * | 6/1975 | Wirt | ........................... E04B 1/86 |
| | | | | | 181/286 |
| 3,913,702 | A | * | 10/1975 | Wirt | ...................... G10K 11/172 |
| | | | | | 181/286 |
| 4,641,726 | A | * | 2/1987 | Fearon | .................... E04C 2/365 |
| | | | | | 181/292 |
| 5,445,861 | A | | 8/1995 | Newton et al. | |

(Continued)

FOREIGN PATENT DOCUMENTS

| EP | 3454329 A1 | * | 3/2019 | ............. B32B 15/01 |
| EP | 3637413 A1 | * | 4/2020 | ............. F02K 1/827 |

(Continued)

OTHER PUBLICATIONS

Search Report for FR 1761249, completed Jul. 17, 2018, 2 pages.

*Primary Examiner* — Forrest M Phillips (74) *Attorney, Agent, or Firm* — Nixon & Vanderhye P.C.

(57) ABSTRACT

An acoustic panel (1) includes a plate (2) made of an acoustic absorbing material (3), as well as a resistive skin (4) and a backing skin (6) arranged respectively on both sides of the plate (2), the acoustic panel (1) including acoustic elements (8) able to carry out an acoustic absorption, each of them being arranged in a housing (7) provided in the plate (2) with an opening (9) in front of the resistive skin (4). The combination of the plate (2) and the acoustic elements (8) allows to combine the sound attenuation properties of these two types of elements and to increase the frequency range of sounds that can be attenuated by the acoustic panel (1), without increasing the dimension.

21 Claims, 4 Drawing Sheets

(56) References Cited

U.S. PATENT DOCUMENTS

| | | | | |
|---|---|---|---|---|
| 5,512,715 | A * | 4/1996 | Takewa | E04B 1/86 181/286 |
| 6,125,965 | A * | 10/2000 | Wang | E04B 1/86 181/286 |
| 7,337,875 | B2 * | 3/2008 | Proscia | F02K 1/827 181/214 |
| 7,819,224 | B2 * | 10/2010 | Borchers | F02C 7/24 181/292 |
| 7,963,362 | B2 * | 6/2011 | Lidoine | F02C 7/24 181/214 |
| 2013/0186707 | A1 * | 7/2013 | Richter | G10K 11/172 181/292 |
| 2015/0027629 | A1 * | 1/2015 | Butler | B29D 99/0021 156/306.6 |
| 2015/0041247 | A1 | 2/2015 | Ichihashi | |
| 2015/0041248 | A1 * | 2/2015 | Ichihashi | F02K 1/827 181/292 |
| 2018/0304986 | A1 * | 10/2018 | Porte | F02C 7/045 |

FOREIGN PATENT DOCUMENTS

| | | | | |
|---|---|---|---|---|
| EP | 3696090 | A1 * | 8/2020 | F02K 1/827 |
| FR | 3 026 122 | | 3/2016 | |

\* cited by examiner

SOUND ATTENUATION PANEL FOR AN AIRCRAFT

RELATED APPLICATION

This application claims priority to French Patent Application 1761249 filed Nov. 28, 2017, the entirety of which is incorporated by reference.

FIELD

The present invention relates to an acoustic attenuation panel for aircraft, and in particular for an aircraft engine nacelle cowling.

BACKGROUND

It is known that, on an aircraft, for example on a transport airplane, significant noises are often generated, in particular by the engines of the aircraft. It is a known practice, to reduce the sound effect produced by the engines of the aircraft, to provide, in particular on the nacelles of the engines, walls provided with panels exhibiting a good sound absorption.

An acoustic attenuation panel, called acoustic panel hereinbelow, generally comprises a plate made of a material and/or a structure exhibiting good sound absorption properties, particularly at audible frequencies corresponding to the most noise. The attenuation is provided generally through a "quarter-wave" or "Helmholtz" physical structure. This structure is used for sound absorption and may be made of a cellular material, foam or a fibrous material.

The acoustic attenuation panel typically has plate(s) with honeycomb cellular structures. The faces (sides) of each plate has a resistive skin, such as a perforated skin, and an unperforated backing skin.

The acoustic attenuation panel is arranged so that the resistive skin is situated to face the noise source, particularly upstream and/or downstream of the fan in the case of an aircraft engine, to produce an effective absorption of the noise generated upstream and downstream of the fan.

In an acoustic attenuation panel, the size of the cells (section and height) of the honeycomb structure is overall matched to the frequency of the noise to be absorbed. If the noise varies, particularly if the frequency of the noise to be absorbed drops (by approximately 300 Hz to 700 Hz), for example because of a reduction of the speed of rotation of the fan associated with an increase in its diameter, it is necessary to increase the height of the cells, which generates an increase in the thickness of the cellular structure.

This conventional approach of increasing the thickness of the cellular structure has the disadvantage of having to increase the thickness of the structure, in particular the cellular material of the acoustic panel, to adapt it to different noises and primarily noises of lower frequency, generated for example by a fan of greater diameter and of reduced rotation speed. This increase in the size of the honeycomb structure results in disadvantages in terms of weight and size (surface area), which penalizes the drag of the acoustic panel.

SUMMARY

The invention disclosed herein may be embodied to remedy these disadvantages (weight and thickness) of the panel structure in an acoustic attenuation panel. The invention may be embodied as an acoustic panel for aircraft, and in particular for a nacelle of an engine of the aircraft. The acoustic panel includes a plate made of a sound-absorbing material (or sound absorption material), a resistive skin and a backing skin that are arranged, respectively, on either or both sides of the plate(s) forming an acoustic attenuation panel.

The inventive acoustic plate includes a plurality of transverse recesses formed in a sound-absorbing material of the plate. The acoustic elements are elongated to extend down in to the recesses elements. The acoustic elements are formed a sound absorbing material. Each acoustic element has an opening at least at one longitudinal end of the element facing the resistive skin. The acoustic elements are each fixed by having a peripheral surface in contact in one of the transverse recesses formed in the plate.

The acoustic elements may be incorporated in the plate. The plate and acoustic elements may be made of the same or different sound-absorbing material(s). The acoustic elements may be formed of material or shaped to absorb noises exhibiting frequencies different, for example lower frequencies, than the frequencies of noises absorbed by the plate. The panel of the acoustic plate and the acoustic elements arranged in the panel combines the sound absorption properties of the plate and elements to absorb more frequencies of noise than would be absorbed by the plate without the acoustic elements. In other words, because the acoustic elements are incorporated in the plate, the elements increase the sound absorption capabilities and properties of the plate while adding little to the bulk and weight of the acoustic panel.

The acoustic elements may be produced to have different shapes. In a first embodiment, at least some of said acoustic elements have a conical shape. The acoustic elements may be formed in other shapes such as a cylindrical form, a prism with an open end, a rectangular box with an open end or a semi-spherical form with an open side.

The acoustic elements may be fixed to the sides of the recesses in the plate by being glued, welded or brazed to the recesses. Other fixing materials or devices may be used to secure the acoustic elements in the recesses of the plate.

At least some of the acoustic elements may be provided with a closed bottom at a longitudinal end opposite to opening of the element.

At least some of the acoustic elements may be provided with an auxiliary opening at a longitudinal end opposite to the opening. The auxiliary opening being situated at a distance from the backing skin.

At least some of said acoustic elements may be arranged in the plate in patterns such as: random, squares, and in staggered rows.

At least some of the acoustic elements may be secured with a flange surrounding the opening for the element, wherein each flange is fixed to the resistive skin and/or to the plate made of sound absorption material.

The acoustic panel may include acoustic elements of all the same type. Or, the acoustic panel may include acoustic elements of different types. Each type of acoustic element may be configured to allow an acoustic absorption prioritized to at least one of a defined range of acoustic frequencies, such as the ranges of frequencies expected to correspond to the loudest noises from a fan or engine.

Moreover, acoustic elements of the same type in a plate may be group together on the plate, such as in various zones arranged on the plate.

The plate with acoustic elements may have one or more of the following characteristics:

(i) at least the resistive skin is curved (single or dual curvature, convex and/or concave), and the acoustic elements are arranged such that their longitudinal direction is substantially radial, locally, to the curved resistive skin;

(ii) for at least some of the acoustic elements, each acoustic element has a specific geometry configured to be incorporated in the recess so as to create a free space (mechanical play) between the acoustic element and the recess, wherein the free space being filled by a so-called filling material;

(iii) at least some of the acoustic elements have a dual structure with two similar pieces, for example two cones or two cylinders, one of which is incorporated in the other;

(iv) the resistive skin has a sound permeability, at least for sounds that have to be attenuated by the acoustic panel, that is greater than the sound permeability of the backing skin; and (v) the sound-absorbing material of the plate is produced to have a cellular structure, such as a honeycomb structure, and/or to be formed of foam, a fibrous material and/or a sintered material.

The invention may be embodied as a method for producing an acoustic panel including the successive steps:

(i) forming the plate made of sound-absorbing material;

(ii) forming transverse recesses in the sound-absorbing material of the plate, wherein the recesses may be open-ended or closed ended;

(iii) placing and fixing the acoustic elements in the recesses; and (iv) arranging and fixing the resistive skin and the backing skin on either side of the plate.

BRIEF DESCRIPTION OF THE DRAWINGS

The attached figures will give a good understanding of how the invention can be produced. In these figures, identical references denote similar elements. More particularly.

DETAILED DESCRIPTION

Figure 1:
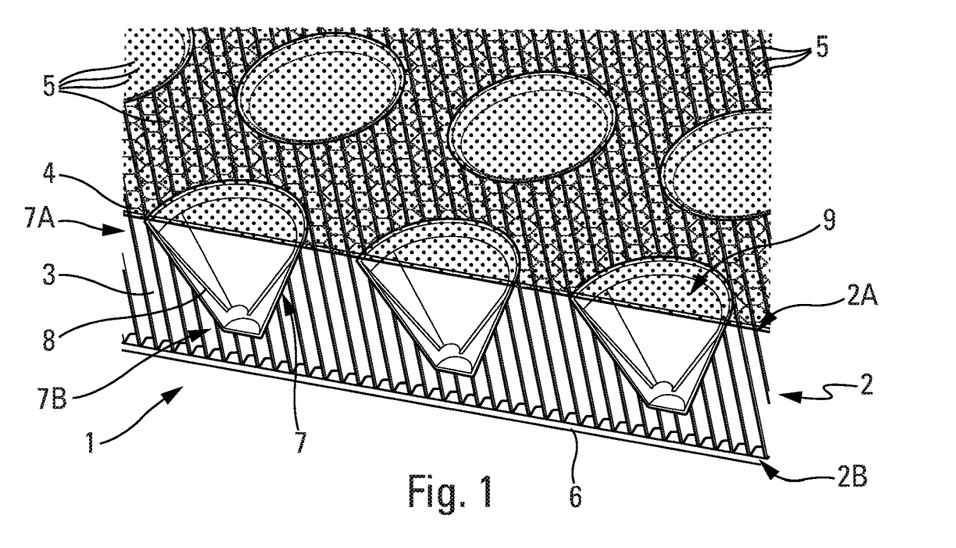
FIG. 1 is a schematic, cross-sectional and perspective view of a first particular embodiment of an acoustic panel.
Figure 2:
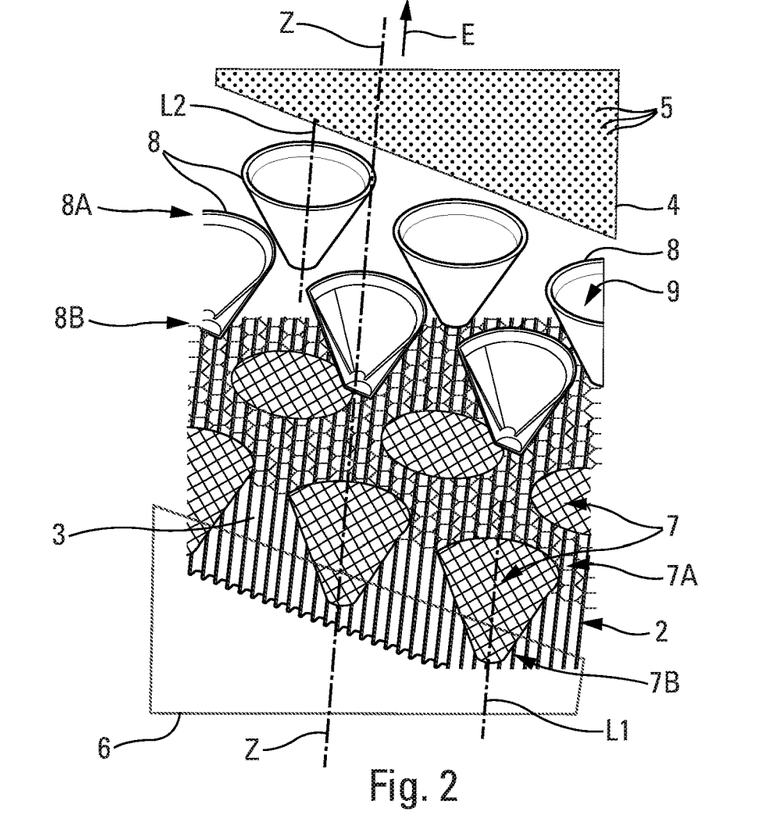
FIG. 2 is an exploded view of the acoustic panel of FIG. 1.

FIGS. 1 and 2 show an acoustic panel 1 (or acoustic attenuation panel) represented schematically in FIG. 1 and that makes it possible to illustrate the invention, is intended to make it possible to reduce (or attenuate) noise by absorbing it, on an aircraft, such as a passenger and/or cargo transport aircraft. The acoustic panel 1 may be applied to a nacelle to reduce noise passing through the nacelle from an engine of an aircraft.

The acoustic panel 1 may include:

(i) a plate 2 made of a sound-absorbing material 3, which is absorbing noise and thereby attenuating noise;

(ii) a resistive skin 4 which is permeable to sound and which may be provided with a plurality of perforations (or holes, voids, openings) 5, passing right through the resistive skin 4. The perforations 5 are represented by dots in FIGS. 1 and 2; and (iii) a backing skin 6, for closing the acoustic panel 1. This backing skin 6 is not perforated and has a certain impermeability to sounds.

The resistive skin 4 may have a sound permeability, at least to sounds intended to be attenuated by the acoustic panel 1, that is greater than the backing skin 6.

The resistive 4 and backing 6 skins are arranged and fixed, respectively, on either side of the plate 2, namely onto a (front) face 2A of the plate 2 for the resistive skin 4 and onto a (rear) face 2B of the plate 2 for the backing skin 6 (FIG. 1).

The acoustic panel 1 may be arranged so that the resistive skin 4 is positioned in proximity and/or facing the noise source to be attenuated. The resistive skin 4 is arranged closer to the noise source than the backing skin 6. The noise penetrates through the perforations 5, through the resistive skin 4, into the plate 2 where it is attenuated. The resistive skin 4 is produced to exhibit mechanical strength that is sufficient according to the application considered, in particular to withstand the pressure of an air flow, the accelerations of the load factors in the case of an aircraft engine.

The resistive skin 4 may be aerodynamic such that is configured to be in contact with air flow over aircraft.

The resistive skin 4 may be produced in different forms, such as:

(i) a perforated or micro-perforated skin with holes of different forms (circular or oblong);

(ii) a finely woven metal or polymer wire mesh in order to be permeable to sound, but to limit the aerodynamic interactions and to reduce the drag; and (iii) a more or less complex assembly composed of wire mesh and of reinforcements based on composite or metal materials.

The backing skin 6 can also be aerodynamic (in contact with the aerodynamic flow) according to the configurations and the installation of the acoustic panel on the aircraft.

FIG. 2 shows an axis Z orthogonal to the plate 2 (substantially planar in the example in this FIG. 2). Furthermore, an arrow E indicates a direction defining a so-called forward direction (directed according to the axis Z and the noise source to be processed) relative to the plate 2. The direction opposite to that of the arrow E defines a so-called backward direction relative to the plate 2. Hereinafter in the description, the adjectives rear and front are defined relative to the direction of the arrow E.

According to the invention, the plate 2 of the acoustic panel 1 is provided with a plurality of transverse recesses 7 which are formed in the sound-absorbing material 3 of said plate 2.

The recesses 7 has a longitudinal axis L1, as shown in FIG. 2. Axis L1 is transverse, e.g., perpendicular or inclined, to the plate 2. Axis L1 may be parallel to the axis Z, and thus locally orthogonal to the plate 2.

The acoustic panel 1 includes a plurality of acoustic elements 8 elongated along an axis L2, which may be parallel to L1. The acoustic elements 8 absorb sound and are seated in the recesses 7. The acoustic elements 8 may have a frustoconical form with an axis along L2, an opening (base) 9 at a side 2A of the plate and a narrow end positioned within the plate. Noise enters the openings 9 at the front 8A of the acoustic elements and are attenuated by the acoustic elements 8. The acoustic elements 8 are each positioned in a respective one of the transverse recesses 7 in the plate 2. The opening 9 of the acoustic elements face the resistive skin 4 covering a side 2A of the plate 2.

Acoustic elements 8 may be incorporated in the plate 2 of the acoustic panel 1. The acoustic elements 8 and the plate may be made of the same or different sound absorbing materials and the density of the sound absorbing materials may differ between the acoustic elements and the plate.

The acoustic elements 8 may be tuned to absorb different frequencies of noise than the material 3 forming the acoustic plate 2. This ability to absorb different frequencies of noise allows the acoustic panel 1 to be configured to absorb to absorb noises exhibiting different frequencies, such as lower audible frequencies. The combination of the acoustic plate 2 and acoustic elements 8 allows for the design of an acoustic panel having combined properties and characteristics of sound absorption of the acoustic elements 8 and the plate 2, and thus increase the range of noise frequencies that can be attenuated by the acoustic panel 1.

The longitudinal ends (along the longitudinal axis L1) of a recess 7, front and rear, are respectively denoted by the references 7A and 7B, and the longitudinal ends (along the longitudinal axis L2) of an acoustic element 8, front and rear, are respectively designated by the references 8A and 8B, as shown for example in FIG. 2.

Figure 5:
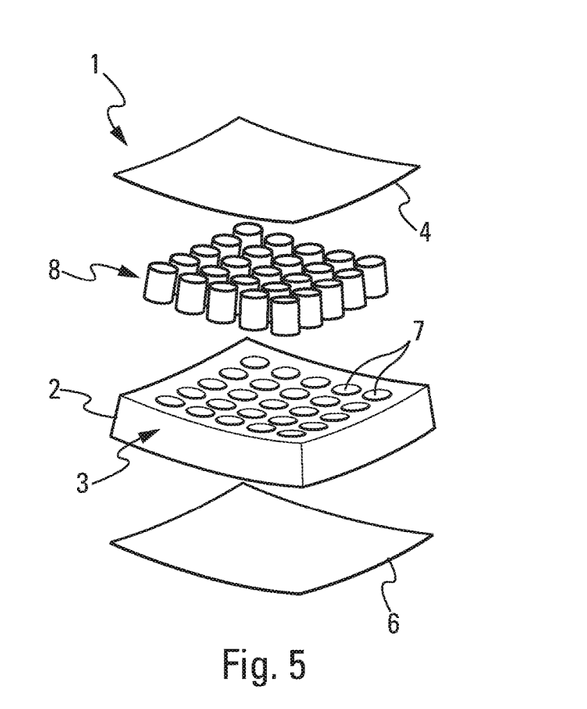
FIG. 5 is an exploded view of the acoustic panel of FIG. 4.

The acoustic element 8 may have a shape similar to the recess 7 into which it is place, for example a tapered form as in the example of FIGS. 1 and 2. Alternatively, the recess 7 and acoustic elements may have a cylindrical form, as shown in FIG. 5, wherein the recess 7 is sized to allow the acoustic element 8 to have peripheral contact (outer contact) with the recess 7. Peripheral contact means that the outer face 18 of the acoustic element 8 is in contact, at least partly and possibly entirely, with an inner face 17 of the recess 7, as shown in FIGS. 3, 6, 7 and 8. Seating the acoustic elements in recesses 6 of the plate reduces the bulk of the acoustic panel 1 which includes the plate 2.

The acoustic elements 8 may be fixed in the recesses 7 of the plate 2. The elements 8 may be fixed such that the outer peripheral surface(s) of each element is bonded or otherwise fixed to a surface of the recess 7. Thus, the acoustic elements 8 may be glued, welded or brazed to the recesses 7 depending on the materials used. The elements may be fixed by any other fixing methods suited to the materials of the acoustic element 8 and of the plate 2 and to the fixing process used. The acoustic elements 8 may be produced in different ways.

Figure 3:
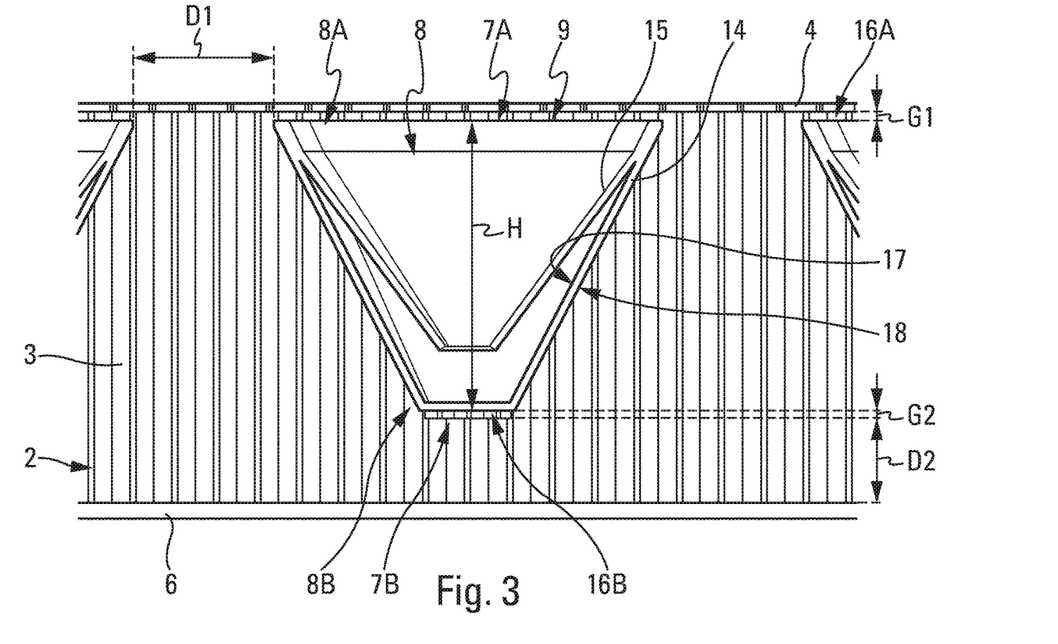
FIG. 3 is a schematic cross-sectional view of an acoustic element mounted in the acoustic panel of FIG. 1.

FIGS. 1 to 3 show conical acoustic elements 8 which are tapered from an opening 9, 8A to a narrow end 8B. The tapered acoustic element 8 comprises, as represented in detail in FIG. 3, a double cone provided with an outer cone 14, in which an inner cone 15 is arranged. The cones 14 and 15 are fixed together at the end 8A (outer end) of the acoustic element 8. The acoustic element 8 shown in FIGS. 1 to 3 has a double-walled structure formed by two frustoconical cones 14, 15 sections, one inserted in the other.

In FIG. 3, the acoustic element 8 has a length H along its longitudinal axis L2 (shown in FIG. 2). Furthermore, two adjacent acoustic elements 8 are spaced apart from one another at the end 8A by a distance D1. This distance D1 is chosen, in particular, as a function of the number of acoustic elements 8 needed and of the structural strength of the plate 2.

Provision can also be made for the plate 2 to have a thickness D2 between the backing skin 6 and the end 7B (rear end) of the recess 7. This distance D2 is chosen, in particular, as a function of the structural strength of the plate 2, and of the size of the different acoustic elements 8 provided and of the thickness of the plate 2 needed for the absorption.

Furthermore, a space 16A of length G1 can be provided between the end 7A (front end) of the recess 7 and the resistive skin 4, to limit or avoid a contact between the end 8A of the acoustic element 8 and the resistive skin 4.

Furthermore, a space 16B of length G2 can exist in the end 7B (or bottom) of the recess 7 relative to the end 8B of the acoustic element 8 when the latter is arranged in the recess 7. This length G2 depends on the tolerance provided and on the choice of allowing or not allowing a contact between the end 8B of the acoustic element 8 and the material 3 of the plate 2. This free space can be filled by a filling material, for example a glue or an intumescent foam.

By way of illustration (nonlimiting):

H may lie between 20 and 45 millimeters;
D1 may lie between 0 and 20 millimeters;
D2 may lie between 0 and 20 millimeters;
G1 may lie between 0 and 2 millimeters; and
G2 may lie between 0 and 2 millimeters.

Furthermore, in a second embodiment of the acoustic elements, at least some of said acoustic elements 8 have a cylindrical form, for example a cylinder of revolution or a prism.

A cylinder (or cylindrical form) is a solid delimited by a cylindrical surface and by two parallel planes. A cylindrical surface is defined by a generating straight line, of constant direction, moving along a closed curve. When the planes are at right angles to the generating straight line, the cylinder is a straight cylinder. When the closed curve is circular, the cylinder is circular. A straight and circular cylinder is a cylinder of revolution. When the closed curve is a polygon, a prism is obtained.

Figure 4:
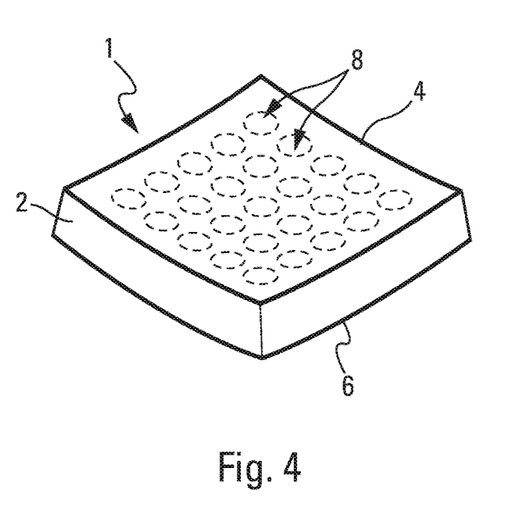
FIG. 4 is a schematic, perspective view of a second particular embodiment of an acoustic panel.

As an illustration of this second embodiment, in the example of FIGS. 4 and 5, the acoustic elements 8 are each produced in the form of a cylinder of revolution. This form allows for a simplified production of the acoustic elements 8 and of the recesses 7.

The acoustic element 8 may have a dual structure with two similar pieces, namely two cylinders, one of which is incorporated in the other.

An acoustic element 8 is obtained which independently produces the sound absorption.

At least the resistive skin 4 may be curved in two directions with respect to a plane through the plate. Similarly, the acoustic panel 1 may curved, as represented in FIG. 4. The acoustic elements 8 may be arranged such that their longitudinal direction is substantially at right angles to the radial surface locally, to the curved resistive skin 4. Alternatively the resistive skin can be curved in just one direction such as to form an arc.

Figure 6:
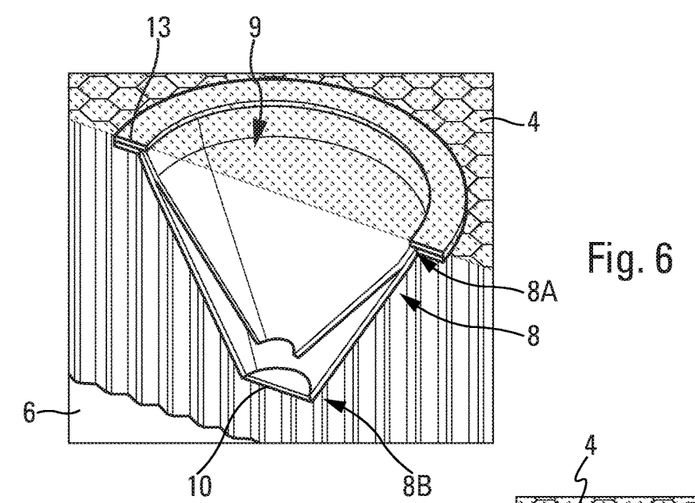
FIG. 6 is a cross-sectional and perspective view of a first particular embodiment of an acoustic element provided with a flange and a bottom.

At least some of the acoustic elements 8 of the acoustic panel 1 may be provided with a closed bottom 10, at the longitudinal end 8B (rear end) opposite to that 8A (front end) provided with the opening 9, as represented in FIG. 6. This first embodiment makes it possible to obtain a closed space inside the acoustic element 8 (with, as single opening, the opening 9), which favors the sound absorption.

Figure 7:
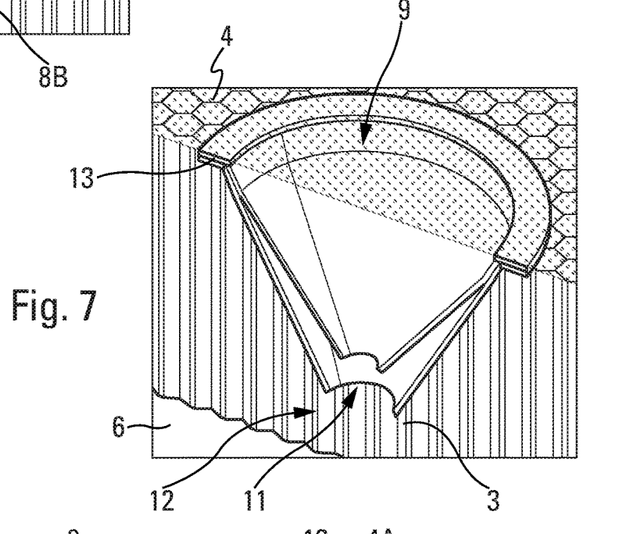
FIGS. 7 and 8 are cross-sectional views, respectively perspective and side view, of a particular embodiment of an acoustic element provided with a flange and without bottom.
Figure 8:
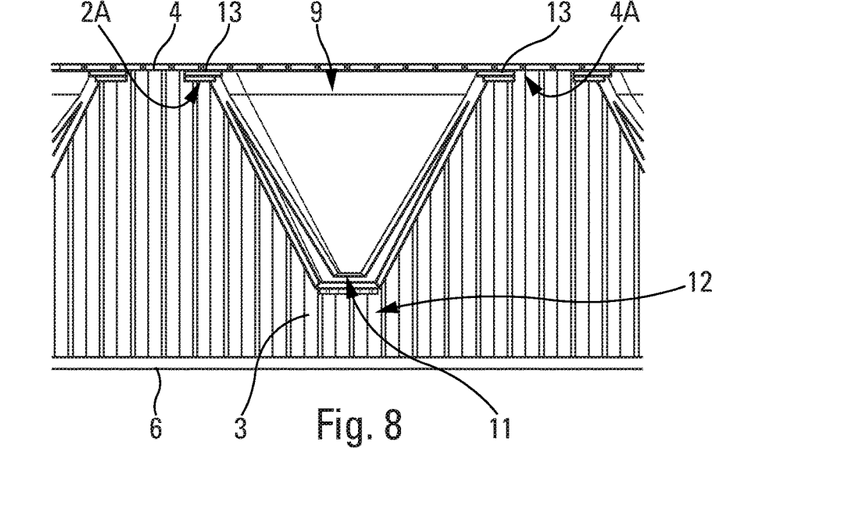

At least some of the acoustic elements 8 may be provided with an auxiliary opening 11 at a longitudinal end 8B (rear end) opposite to that 8A (front end) provided with the opening 9, as represented in FIGS. 7 and 8.

This auxiliary opening 11 may be situated at a distance from the backing skin 6. A zone 12 of material 3 of the plate 2 is thus provided between this opening 11 and the backing skin 6, making it possible in particular to generate a closure of the internal space of the acoustic element 8 at the auxiliary opening 11. The zone 12 can be of length D2. By virtue of this second embodiment, a reduction in the weight of the acoustic element 8 is obtained and the production thereof is simplified. The operation of the acoustic element 8 is coupled with the zone 12. If the distance D2 is nil, the backing skin 6 can serve as bottom.

Figure 9:
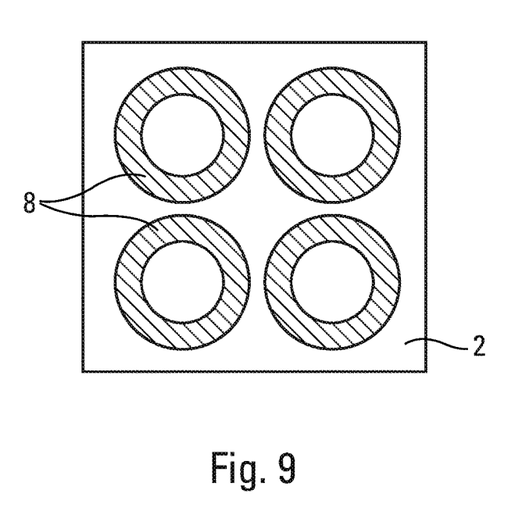
FIGS. 9 and 10 schematically illustrate two different modes of distribution of the acoustic elements in the plate.
Figure 10:
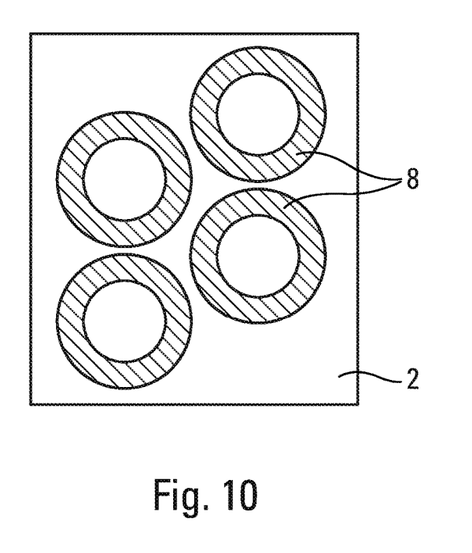

The acoustic elements 8 can be arranged in the plate 2 according to one or more of the following arrangements: a random arrangement, or a gauged arrangement such as, for example, a square arrangement (FIG. 9) or a staggered arrangement (FIG. 10).

The acoustic elements may be grouped together in a plurality of groups, and each group can have a particular arrangement of its acoustic elements. The arrangements of the different groups can be identical, at least for some of them, or be different, at least for some of them.

Some or all of the acoustic elements 8 are provided with a flange 13, as represented in FIGS. 6 to 8. The flange 13 of an acoustic element 8 is a separate annular plate, which is secured to the acoustic element 8 at the end 8A (because the acoustic element is of revolution). The flange 13 radially surrounds the outside of the opening 9 of the acoustic element 8. Furthermore, each of the flanges 13 is fixed to the rear face 4A (FIG. 8) of the resistive skin 4 and/or to the front face 2A of the plate 2.

The flange 13 makes it possible to improve the fixing of the acoustic element 8 and to increase the mechanical strength.

The flange 13 is glued, welded or brazed onto the resistive skin 4 and/or onto the plate 2.

Moreover, in a particular embodiment, the acoustic panel 1 comprises acoustic elements 8 of a plurality (two, three, four, etc.) of different types.

Each type of acoustic element is configured to allow an acoustic absorption that is prioritized in at least one given range of acoustic frequencies.

Sound absorption that is prioritized refers to a considered range of acoustic frequencies should be understood to mean the fact that an acoustic element has acoustic properties allowing it to effectively absorb noises exhibiting frequencies forming part of said considered range of acoustic frequencies, and do so whether or not it is able to absorb noises having frequencies outside of said range.

In a first variant embodiment, the acoustic elements of different types can be mixed, by being, for example, distributed relatively uniformly in the plate. Thus, all the parts of the plate are configured to absorb the same plurality of ranges of acoustic frequencies.

Furthermore, in a second variant embodiment, the acoustic elements of one and the same type, out of said different types, can be grouped together, each time, in at least one given zone of the plate 2.

It is thus possible to provide different zones of the acoustic panel 1 which are each appropriate to the absorption of noises of particular frequencies. This embodiment is particularly advantageous in the presence of different noise sources, exhibiting different frequencies and located at different points.

The acoustic panel 1 is then configured and arranged so that each of these zones is situated as close as possible to the noise source that it has to attenuate.

In the context of the present invention, the plate 2 can be produced in different ways, such as:

(i) a cellular structure, such as a honeycomb structure, or a cellular structure having cells of other forms;

(ii) a foam exhibiting appropriate acoustic properties; or (iii) a fibrous material exhibiting appropriate acoustic properties.

The plate 2 and the acoustic elements 8 may be produced in one and the same material or in different materials. The material of the plate 2 and/or of the acoustic elements 8 can be, for example, a polymer material reinforced with carbon fibers of CFRP (Carbon Fiber Reinforced Polymer) type, with aramid fiber, glass fiber or metal such as aluminum or titanium.

The acoustic panel 1, as described above, advantages including one or more of:

(i) optimized sound absorption due to the selection of the materials and structure of the plate 2 and the acoustic elements 8;

(ii) an ability to process or absorb different ranges of acoustic frequencies due to the different sound absorbing characteristics of the plate 2 and the acoustic elements 8;

(iii) a combination of elements exhibiting different sound absorption properties;

(iv) a sound absorbing panel 1 with desirable weight and bulk properties;

(v) the acoustic elements 8 fixed in the plate 2 enhance the structural strength of the acoustic panel 1 and contribute to the ability of the panel to withstand a certain level of structural loads; and (vi) the acoustic panel 1 may be configured to withstand mechanical and aerodynamic loads.

Figure 11:
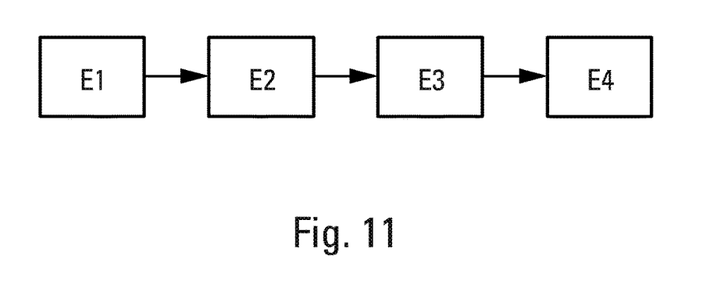
FIG. 11 schematically illustrates the main steps of a method for producing an acoustic panel.

The acoustic panel 1 may be formed by the following successive steps:

(i) a step E1 including the plate 2 of a sound-absorbing material(s) 3, from a material such as a honeycomb or other cellular structure; a foam or a fibrous material;

(ii) a step E2 including forming the transverse recesses 7 in the sound-absorbing material 3 of the plate 2, wherein the recesses 7 may be formed by machining or stamping in particular;

(iii) a step E3 including placing and fixing the acoustic elements 8 in the recesses 7, wherein the acoustic elements 8 having been produced separately in an auxiliary step. The acoustic elements 8 are fixed to the recesses by gluing or brazing in the recesses 7, or by another fixing step suited to the materials of the acoustic element 8 and of the plate 2. In the case of gluing, a film of glue or else a liquid or viscous glue can be used; and (iv) a step E4 including arranging and fixing the resistive skin 4 and the backing skin 6 on either side of the plate 2 provided with the acoustic elements 8.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic panel for aircraft comprising:
   a plate made of a sound-absorbing material;
   a resistive skin and a backing skin, wherein the resistive and backing skins are arranged on opposite sides of the plate;
   a plurality of transverse recesses formed in the sound-absorbing material of the plate, wherein each of the transverse recesses has a depth extending from a side of the plate adjacent the resistive skin towards the backing skin;
   a plurality of acoustic elements each having an elongated form and configured for acoustic absorption, wherein each of the acoustic elements has an opening at a longitudinal end of the acoustic element, is inserted in a respective one of the transverse recesses, and is fixed by a peripheral contact between a sidewall of the acoustic element and the respective one of the transverse recesses, wherein the peripheral contact includes peripheral contact areas between the side wall of the acoustic element and the respective one of the transverse recess, and the peripheral contact areas include a first peripheral contact area at a first depth of the respective one of the transverse recesses and a second peripheral contact area at a second depth, deeper than the first depth, of the respective one of the transverse recesses, and
   the opening in each of the acoustic elements faces the resistive skin.

2. The acoustic panel as in claim 1, wherein at least some of the acoustic elements have a conical form.

3. The acoustic panel as in claim 1, wherein at least some of the acoustic elements have a cylindrical form.

4. The acoustic panel as in claim 1, wherein the acoustic elements are each glued, welded or brazed to the respective one of the transverse recesses.

5. The acoustic panel as in claim 1, wherein at least some of the acoustic elements are provided with a closed bottom at a longitudinal end of the acoustic element opposite to the opening.

6. The acoustic panel as in claim 1, wherein at least some of the acoustic elements include an auxiliary opening at a longitudinal end of the acoustic element opposite to the opening, wherein the auxiliary opening is offset from the backing skin.

7. The acoustic panel as in claim 1, wherein at least some of the acoustic elements are arranged in the plate according to an arrangement, wherein the arrangement is at least one of one of: a random pattern, arranged in squares, and arranged in staggered rows.

8. The acoustic panel as in claim 1, wherein at least some of the acoustic elements are provided with a flange surrounding the opening of the acoustic element, wherein each of the flanges is fixed to the resistive skin and/or to the plate.

9. The acoustic panel as in claim 1, wherein all of the acoustic elements are have a similar shape.

10. The acoustic panel as in claim 1, wherein the acoustic elements have different types of acoustic elements.

11. The acoustic panel as in claim 10, wherein each type of the acoustic elements is configured to absorb a certain range of acoustic frequencies, and the ranges differ between the types.

12. The acoustic panel as in claim 10, wherein the acoustic elements of a same type are grouped together in the plate.

13. The acoustic panel as in claim 1, wherein at least the resistive skin is curved, and the acoustic elements each have a longitudinal direction oriented substantially radial to a region of the resistive skin local to the acoustic element.

14. The acoustic panel as in claim 1, wherein a free space between at least one of the acoustic elements and the recess receiving the acoustic element is filled with a filling material.

15. The acoustic panel as in claim 1, wherein at least some of the acoustic elements include a dual structure in which a first component of the acoustic element is nested in another component of the acoustic element.

16. The acoustic panel as in claim 1, wherein the resistive skin has a sound permeability greater than the backing skin for a certain range of noise frequencies.

17. The acoustic panel as in claim 1, wherein the sound-absorbing material of the plate is formed of at least one of: a cellular structure, a foam, a fibrous material and a sintered material.

18. A method to produce an acoustic panel comprising:
    forming a plate of a sound-absorbing material;
    forming transverse recesses in a first face of the sound-absorbing material of the plate, wherein each of the transverse recesses has a depth extending from a side of the plate adjacent the resistive skin towards the backing skin;
    placing each of the acoustic elements in a respective one of the transverse recesses, wherein each acoustic element has an open end at or facing the first face;
    fixing each of the acoustic elements to the respective one of the transverse recesses by peripheral contact between the side wall of the acoustic element and the respective one of the transverse recess, wherein the peripheral contact includes a first region of peripheral contact at a first depth of the respective one of the transverse recesses and a second region of peripheral contact at a second depth, deeper than the first depth, of the respective one of the transverse recesses,
    applying and fixing a perforated resistive skin over the first face and the open ends of the acoustic elements; and
    applying and fixing a backing skin on a second face of the plate.

19. An acoustic panel comprising:
    a plate formed of a sound-absorbing material, wherein the plate has a first face and a second face opposite to the second face;
    transverse recesses in the first face and extending into the sound-absorbing material of the plate, wherein each of the transverse recesses has a depth extending from a side of the plate adjacent the resistive skin towards the backing skin;
    acoustic elements each positioned in a respective one of the transverse recesses wherein each of the acoustic elements has an open and wide end aligned with or facing the first face, extends into the transverse recess, has a narrow end opposite to the open and wide end, is formed of a sound absorbing material, and has an outer surface fixed to a respective one of the transverse recesses receiving the acoustic element, wherein each of the acoustic elements is in peripheral contact to a sidewall of the respective one of the acoustic elements, and the peripheral contact is at a first peripheral contact area at a first depth of the respective one of the transverse recesses and a second peripheral contact area at a second depth, deeper than the first depth, of the respective one of the transverse recesses;

a resistive skin covering the first face of the plate and the openings of the acoustic elements; and a backing skin covering the second face of the plate.

20. The acoustic panel of claim 19, wherein the acoustic elements each include a first component nested in a second component, wherein an outer surface of the second component abuts the respective recess, and the second component is separated by a gap from the first component and is joined to the first component at the opening of the acoustic element.

21. The acoustic panel of claim 19, wherein at least some of the acoustic elements have a frustoconical shape and an axis extending through the first and second faces.

* * * * *